(12) United States Patent
Takezawa et al.

(10) Patent No.: US 10,329,112 B2
(45) Date of Patent: Jun. 25, 2019

(54) DRIVE TRANSMISSION APPARATUS AND IMAGE FORMING APPARATUS

(71) Applicant: CANON KABUSHIKI KAISHA, Tokyo (JP)

(72) Inventors: Hiroaki Takezawa, Kashiwa (JP); Atsushi Yoshida, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/924,788

(22) Filed: Mar. 19, 2018

(65) Prior Publication Data
US 2018/0305161 A1 Oct. 25, 2018

(30) Foreign Application Priority Data

Apr. 24, 2017 (JP) .................................. 2017-085339

(51) Int. Cl.
*B65H 27/00* (2006.01)
*B65H 29/20* (2006.01)
*G03G 15/00* (2006.01)
*F16H 3/091* (2006.01)
*B65H 5/06* (2006.01)

(52) U.S. Cl.
CPC .............. *B65H 27/00* (2013.01); *B65H 5/06* (2013.01); *B65H 29/20* (2013.01); *F16H 3/091* (2013.01); *G03G 15/6502* (2013.01); *B65H 2403/40* (2013.01); *B65H 2403/42* (2013.01); *B65H 2404/111* (2013.01); *B65H 2404/134* (2013.01); *B65H 2404/16* (2013.01); *B65H 2404/19* (2013.01); *B65H 2601/125* (2013.01)

(58) Field of Classification Search
CPC ........ B65H 3/0638; B65H 5/06; B65H 5/062; B65H 27/00; B65H 29/20; B65H 2402/64; B65H 2403/40; B65H 2402/42; B65H 2404/111; B65H 2404/134; B65H 2404/1342; B65H 2404/13421; B65H 2404/19; F16H 3/091; F16H 48/42
See application file for complete search history.

(56) References Cited

U.S. PATENT DOCUMENTS

| | | | | |
|---|---|---|---|---|
| 5,116,038 A | * | 5/1992 | Kim ..................... | B65H 3/0669 271/10.11 |
| 6,024,357 A | * | 2/2000 | Sheng .................. | B65H 3/0669 271/10.13 |

(Continued)

FOREIGN PATENT DOCUMENTS

| JP | 2011053242 A | | 3/2011 | |
|---|---|---|---|---|
| JP | 2016160975 A | | 9/2016 | |
| JP | 2017001846 A | * | 1/2017 | ........... B65H 45/142 |

*Primary Examiner* — Prasad V Gokhale
(74) *Attorney, Agent, or Firm* — Venable LLP

(57) ABSTRACT

The present disclosure provides a drive transmission apparatus capable of reducing vibration of rotating member. The apparatus includes a shaft, a pin, and a rotating member. The rotating member is engaged with the shaft by the pin and rotates with the shaft. A protruded portion is provided on one of an outer circumferential surface of the shaft and an inner circumferential surface of the rotating member. The rotating member is attached to the shaft with the protruded portion in pressure contact with another one of the outer circumferential surface of the shaft and the inner circumferential surface of the rotating member, so that swinging of the rotating member around the pin is restricted.

20 Claims, 8 Drawing Sheets

(56) References Cited

U.S. PATENT DOCUMENTS

| | | | |
|---|---|---|---|
| 9,302,866 B1* | 4/2016 | Manor | B65H 3/0638 |
| 2001/0015522 A1* | 8/2001 | Herrmann | F16D 7/044 |
| | | | 271/116 |
| 2003/0184000 A1* | 10/2003 | Kim | B65H 1/26 |
| | | | 271/10.11 |
| 2011/0042854 A1* | 2/2011 | Abe | B29C 45/0025 |
| | | | 264/328.1 |
| 2014/0054847 A1* | 2/2014 | Inoue | B65H 3/5261 |
| | | | 271/122 |
| 2017/0293248 A1 | 10/2017 | Yoshida | |
| 2018/0017926 A1 | 1/2018 | Yoshida | |

* cited by examiner

DRIVE TRANSMISSION APPARATUS AND IMAGE FORMING APPARATUS

BACKGROUND OF THE INVENTION

Field of the Invention

The present disclosure relates to a drive transmission apparatus for transmitting driving force and to an image forming apparatus configured to form an image on a sheet.

Description of the Related Art

There is known a pin member such as a parallel pin for engaging a rotating member, such as a gear, a sprocket or a pulley, with a rotatable shaft in a drive transmission apparatus. Japanese Patent Unexamined Application Laid-open No. 2011-053242 discloses a configuration of mounting a gear on a rotary shaft by inserting a columnar parallel pin through a pin hole, which is perforated through the rotary shaft vertically with respect to the axial direction, and by engaging the parallel pin with a groove defined on a side surface of the gear.

However, the configuration disclosed in the above-identified document might cause vibration of the gear with respect to the rotary shaft with the parallel pin acting as a fulcrum in a case where there is a gap between the gear and the rotary shaft due to such factors as tolerance between an inner diameter of the gear and an outer diameter of the rotary shaft. Then, this configuration might cause a trouble such as collision noise between the gear and the rotary shaft as the gear vibrates along with rotation of the gear and the rotary shaft.

SUMMARY OF THE INVENTION

The present disclosure provides a drive transmission apparatus capable of reducing vibration of the rotating member and an image forming apparatus including the same.

According to one aspect of the present invention, a drive transmission apparatus includes: a rotatable shaft; a pin provided on the shaft that projects radially out of an outer circumferential surface of the shaft; a rotating member configured to rotate with the shaft, the rotating member comprising an inner circumferential surface facing the outer circumferential surface of the shaft and an engage portion configured to engage with the pin; and a protruded portion provided on one of the outer circumferential surface of the shaft and the inner circumferential surface of the rotating member and disposed in pressure contact with another one of the outer circumferential surface of the shaft and the inner circumferential surface of the rotating member.

According to another aspect of the present invention, a drive transmission apparatus includes: a metal rotatable shaft; a metal pin inserted through a hole formed in the shaft and projecting radially out of an outer circumferential surface of the shaft; and a cogwheel composed of synthetic resin and configured to rotate with the shaft, the cogwheel comprising: an inner circumferential surface facing the outer circumferential surface of the shaft; an engage groove defined on one side surface of the cogwheel in an axial direction of the shaft and configured to engage with the pin; and a plurality of teeth arrayed along a circumferential direction of the shaft, wherein the cogwheel further comprises a first protruded portion and a second protruded portion each protruding radially inward from the inner circumferential surface and disposed in pressure contact with the outer circumferential surface of the shaft, and wherein the first protruded portion and the second protruded portion are disposed respectively on one side and on another side with respect to a rotation axis of the shaft when viewed in a direction in which the pin projects.

According to still another aspect of the present invention, an image forming apparatus includes: an image forming unit configured to form an image on a sheet; a conveyance member configured to convey the sheet by rotating in contact with the sheet; and a drive transmission apparatus configured to transmit driving force to the conveyance member, the drive transmission apparatus comprising: a rotatable shaft; a pin provided on the shaft and projects radially out of an outer circumferential surface of the shaft; a rotating member configured to rotate with the shaft, the rotating member comprising an inner circumferential surface facing the outer circumferential surface of the shaft and an engage portion configured to engage with the pin; and a protruded portion provided on one of the outer circumferential surface of the shaft and the inner circumferential surface of the rotating member and disposed in pressure contact with another one of the outer circumferential surface of the shaft and the inner circumferential surface of the rotating member.

Further features of the present invention will become apparent from the following description of exemplary embodiments with reference to the attached drawings.

DESCRIPTION OF THE EMBODIMENTS

A drive transmission apparatus of the present disclosure will be described below with reference to the drawings. As described in detail below, this drive transmission apparatus can be used as a drive transmission unit interposed between a driving source and an actuator of an image forming apparatus exemplified by a printer, a copier, and a multi-function printer. This technology can be utilized not only for the image forming apparatus but also for an arbitrary drive transmission apparatus exemplified by industrial machines, automobile parts and others.

Outline of Image Forming Apparatus

Figure 1:
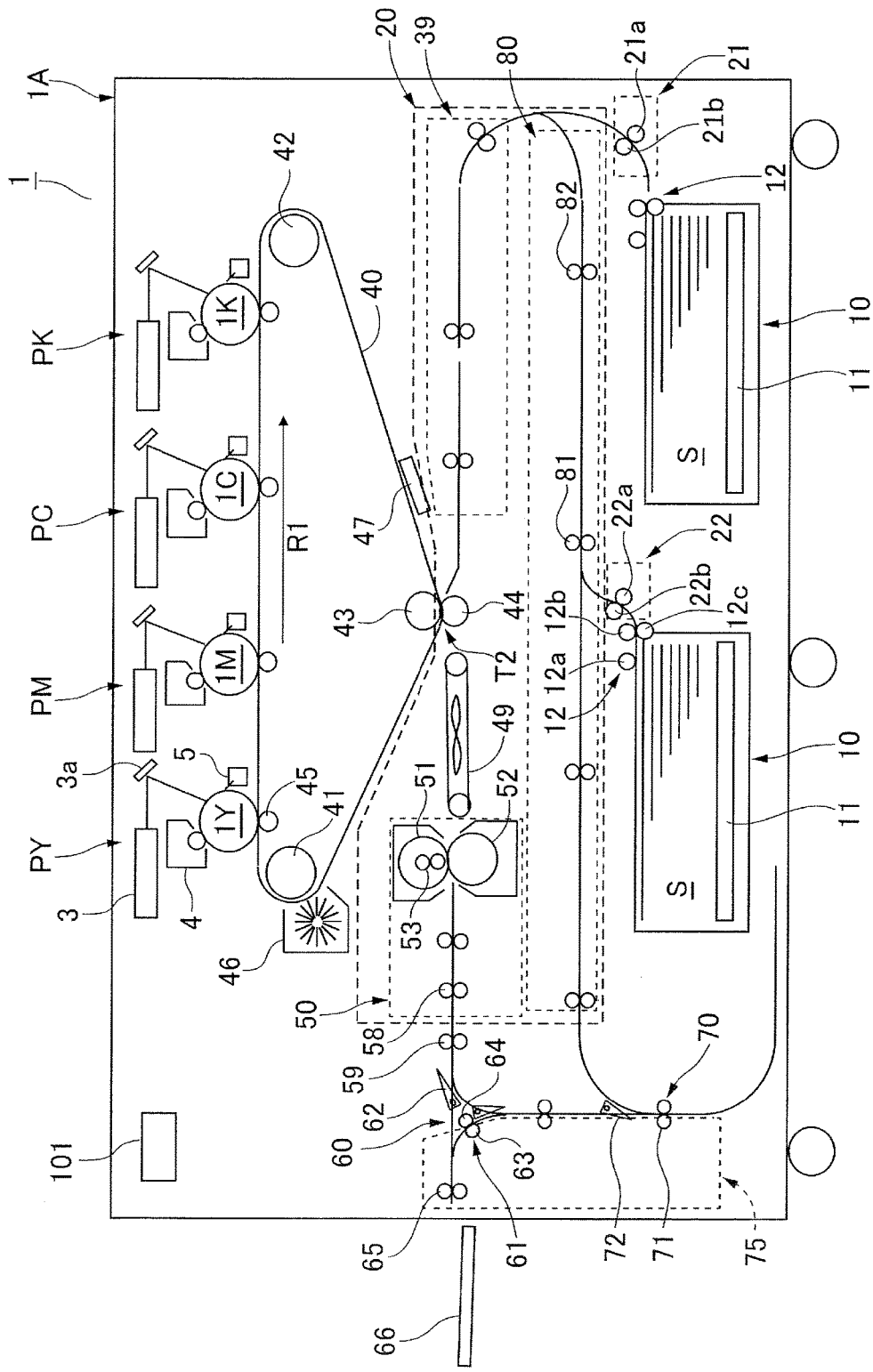
FIG. 1 is a schematic diagram illustrating a configuration of an image forming apparatus of the present disclosure.

As illustrated in FIG. 1, the drive transmission apparatus of the present disclosure composes a part of the image forming apparatus 1, which is an electro-photographic full-color laser printer. An apparatus body 1A of the image forming apparatus 1 includes a sheet feed cassette 10 configured to store a sheet S and image forming portions PY, PM, PC and PK configured to form an image on the sheet S fed from the sheet feed cassette 10. The sheet S used as a recording material is a printing sheet of paper, an envelope, a plastic film such as an overhead-projector sheet, a cloth or the like. The image forming portions PY, PM, PC and PK respectively include photosensitive drums 1Y, 1M, 1C and 1K each serving as an electro-photoconductor, and are configured to form toner images of yellow, magenta, cyan and black respectively. The respective toner images are first transferred (a primary transfer) to an intermediate transfer belt 40 and are then secondarily transferred to the sheet S at a secondary transfer portion. Thus, a full-color image is formed on the sheet S.

A configuration of the image forming portions PY, PM, PC and PK, each of which is an example of image forming unit, and a toner image forming process, or an imaging operation, will be described. It is noted that, because these image forming portions have the same configuration except of colors of toners used for development, only the yellow image forming portion PY will be described as representative of the other image forming portions PM, PC and PK and a separate description of the other image forming portions PM, PC and PK will be omitted below.

Besides the photosensitive drum 1Y, the image forming portion PY includes an exposing unit 3, a developing unit 4, a drum cleaning unit 5 and others. The photosensitive drum 1Y is a drum-shaped photoconductor having a photosensitive layer on an outer circumferential part thereof and rotates in a predetermined direction along a rotation direction of the intermediate transfer belt 40. A surface of the photosensitive drum 1Y is configured to be charged to a predetermined potential, i.e., dark potential, by electric charges supplied from a charging portion such as a charging roller. The exposing unit 3 emits a laser beam modulated in accordance with image information and scans the photosensitive drum 1Y through an optical system including a reflection device 3a to draw an electrostatic latent image on the surface of the photosensitive drum 1Y. The developing unit 4 stores two-component developer containing toner and carrier and supplies the toner to the photosensitive drum 1Y to develop the electrostatic latent image as a toner image.

The toner image formed on the photosensitive drum 1Y is then transferred onto the intermediate transfer belt 40 at a nip portion, i.e., a primary transfer portion, between the primary transfer roller 45 and the intermediate transfer belt 40. The primary transfer roller 45 is in pressure contact with the photosensitive drum 1Y with the intermediate transfer belt 40 interposed therebetween and applies a predetermined bias voltage to move the toner to the intermediate transfer belt 40 by electrostatic force. Thus, the primary transfer to the toner image is carried out. Residual toner left on the photosensitive drum 1Y after the transfer is removed by the drum cleaning unit 5.

The intermediate transfer belt 40, serving as an intermediate transfer body, is wrapped around a driving roller 41, a driven roller 42, a secondary transfer inner roller 43 and a primary transfer roller 45 and is driven to rotate clockwise (in a direction of an arrow R1) in FIG. 1 by the driving roller 41. The abovementioned image forming operation is conducted in parallel in the image forming portions PY, PM, PC and PK, and four-colored toner images are transferred so as to overlap with each other. Thus, the full-color toner image is formed on the intermediate transfer belt 40. This toner image is moved while being borne on the intermediate transfer belt 40 and is conveyed to a secondary transfer portion T2, which is a nip portion between the secondary transfer inner roller 43 and the secondary transfer roller 44. A bias voltage whose polarity is reverse to the charged polarity of the toner is applied to the secondary transfer roller 44 serving as a transfer member, and thereby the full-color toner image is collectively transferred onto the sheet S. It is noted that residual toner left on the intermediate transfer belt 40 after the transfer is removed by a belt cleaning unit 46.

The sheet S onto which the toner image has been transferred is conveyed to a fixing unit 50 by a pre-fixing conveyance unit 49. The fixing unit 50 includes a pair of fixing rollers 51 and 52 that nip and convey the sheet S and a heat source 53 such as a halogen heater, and is configured to apply pressure and heat to the toner image borne on the sheet S. Thereby, toner particles melt and are fixed onto the sheet S so that a fixed image fixed on the sheet S is obtained.

Next, a configuration and an operation of a sheet conveyance system for feeding the sheet S stored in the sheet feed cassette 10 and for discharging the sheet S onto which the image has been formed out of the apparatus will be described. The sheet conveyance system includes the sheet feed cassette 10, a feed unit 12, drawing roller pairs 21 and 22, a registration unit 39, the pre-fixing conveyance unit 49, the fixing unit 50, a branch unit 60, a reversing unit 70 and a duplex conveyance unit 80.

One or a plurality of the sheet feed cassettes 10 are drawably mounted in the apparatus body 1A, respectively. Each sheet feed cassette 10 includes an elevating plate 11 that can be elevated/lowered with respect to a cassette body, and the feed unit 12 delivers the sheet S stacked on the elevating plate 11 toward the drawing roller pairs 21 and 22. The feed unit 12 includes a pickup roller 12a configured to deliver an uppermost sheet S out of the sheet feed cassette 10, a feed roller 12b configured to convey the sheet S received from the pickup roller 12a, and a retard roller 12c configured to separate the uppermost sheet S from other sheets.

The drawing roller pairs 21 and 22 include driving rollers 21a and 22a and driven rollers 21b and 22b respectively driven by the driving rollers 21a and 22a, and convey the sheet S received from the feed unit 12 toward a registration unit 39. It is noted that the sheet S conveyed by the drawing roller pair 22 upstream of the sheet conveyance path, (i.e., on a left side in FIG. 1) is conveyed to the registration unit 39 through duplex conveyance path rollers 81 and 82 composing a duplex conveyance unit 80.

The registration unit 39 corrects a skew of the sheet S by a shutter mechanism or the like and conveys the sheet S to the secondary transfer portion T2 in synchronization with the toner image conveyed by the intermediate transfer belt 40. The sheet S onto which the toner image has been transferred at the secondary transfer portion T2 and of which the toner image has been fixed by the fixing unit 50 is conveyed to a branch unit 60 having a switching member 62 capable of switching the conveyance path of the sheet S. When image formation to the sheet S has been completed, the sheet S is discharged to a discharge tray 66 disposed outside of the apparatus body 1A by a discharge roller pair 65. In this case, the discharge path of the sheet S is switched by the switching member 62 corresponding to setting of a print job, and the sheet S can be discharged through a discharge roller pair 61 and the discharge roller pair 65 in a condition in which the sheet S is reversed by a reversing unit 70. That is, the image forming apparatus 1 is implemented with a discharging mode in which the sheet S is discharged to the discharge tray 66 in a so-called face-down condition in which a surface onto which the image has been formed faces down.

In a case where an image is to be formed on a back surface of the sheet S, the sheet S is passed to the reversing unit 70 by the switching member 62 and is then passed to a duplex conveyance unit 80. The reversing unit 70 includes a reverse conveyance roller pair 71 configured to rotate normally and reversely and a guide member 72 configured to guide the sheet S switched back and conveyed by the reverse roller pair 71. The reversing unit 70 passes the sheet S to the duplex conveyance unit 80 such that the front surface and the back surface of the sheet S are reversed. The duplex conveyance unit 80 includes a guide member (not illustrated) forming a duplex conveyance path extending in a horizontal direction, the duplex conveyance path rollers 81 and 82 and others, and conveys the sheet S received from the reversing unit 70 toward the registration unit 39. Thereby, the sheet S is conveyed again to the secondary transfer portion T2 and the fixing unit 50 to form an image on the back surface. The sheet S on which the images have been formed onto the both surfaces is discharged to the discharge tray 66 through the branch unit 60.

A part of the conveyance system of the present embodiment is configured as a drawer portion 20 that can be drawn out of the apparatus body 1A. The drawer portion 20 includes an upper conveyance path and the duplex conveyance unit 80 disposed under the upper conveyance path, where the upper conveyance path includes the registration unit 39, the secondary transfer roller 44, the pre-fixing conveyance unit 49 and the fixing unit 50. The apparatus body 1A also includes a conveyance sensor 47 for monitoring a conveyance status of the sheet S, and control portion 101 informs a user of an occurrence of a conveyance failure and of information about part replacement and inspection. In such a case, the user will conduct required works with the drawer portion 20 drawn out of the apparatus body 1A and finish the works by pushing back and mounting the drawer portion 20 again to the apparatus body 1A.

It is noted that the abovementioned configuration is merely an example of the image forming apparatus, and the image forming apparatus may include an inkjet-type image forming unit instead of the electro-photographic image forming unit. Still further, while some image forming apparatus include an attachment device such as an option feeder and a sheet processing apparatus besides the apparatus body including the image forming unit, the drive transmission apparatus described below may be used for transmission of drive in such attachment device.

Gear Transmission Mechanism

Figure 2A:
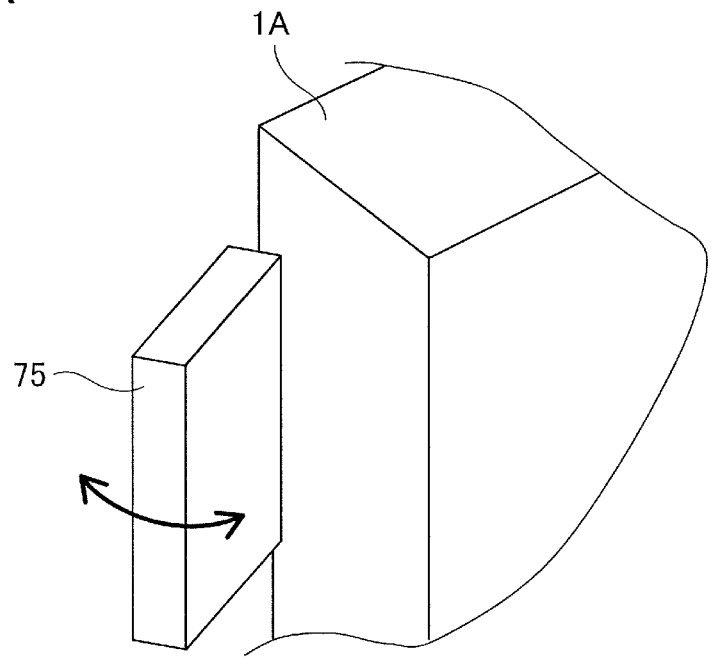
FIG. 2A is a perspective view illustrating an openable cover of the image forming apparatus.
Figure 2B:
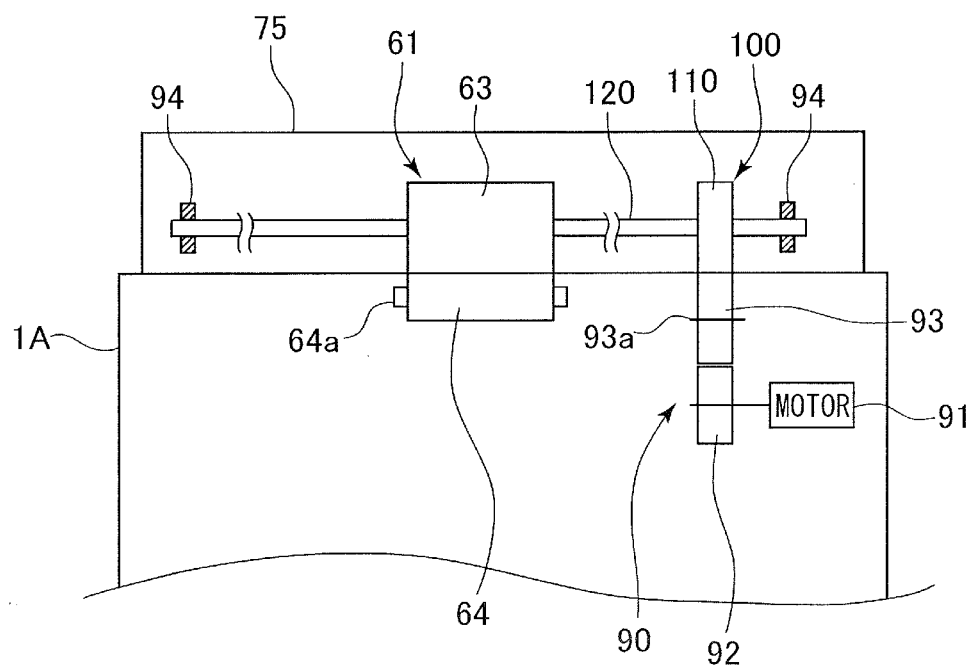
FIG. 2B is a schematic diagram illustrating a drive configuration of a driving roller supported by the openable cover.

Next, a gear transmission mechanism serving as a drive transmission apparatus will be described. This gear transmission mechanism is used as a drive transmission unit to transmit driving force to the conveyance roller pair 61 of the branch unit 60, which is one example of the conveyance member. As illustrated in FIG. 1, a part of the reversing unit 70 and the branch unit 60 is disposed on an openable cover 75, which is an openable member opened and closed with respect to the apparatus body 1A. As illustrated in FIG. 2A, the openable cover 75 is turnable with respect to the apparatus body 1A centering on a hinge portion provided on a back side of the apparatus body 1A in FIG. 1. Here, as illustrated in FIG. 2B, the driving roller 63 of the conveyance roller pair 61 is disposed on the openable cover 75, and the driven roller 64 driven by the driving roller 63 is disposed on the apparatus body 1A. The driving roller 63 is a first roller of the present embodiment and the driven roller 64 is a second roller of the present embodiment.

More specifically, the driving roller 63 is attached to a roller shaft 120, and the roller shaft 120 is rotatably supported by bearings 94 and 94 fixed to the openable cover 75 at both ends of the roller shaft 120. Meanwhile, the driven roller 64 is a roller member disposed on the apparatus body 1A and is supported by a shaft 64a disposed in parallel with the roller shaft 120. When the openable cover 75 is closed, the driving roller 63 comes in contact with the driven roller 64 with a predetermined nip pressure. The driving roller 63 is separated from the driven roller 64 when the openable cover 75 is open. Still further, the guide member forming the conveyance path of the sheet conveyed by the conveyance roller pair 61, the reverse roller pair 71 of the reversing unit 70 and others are separated by opening the openable cover 75. This arrangement makes it possible for an operator to remove a sheet jammed at the branch unit 60 or at the reversing unit 70.

As illustrated in FIG. 2B, the gear transmission mechanism 90 is interposed between a motor 91 disposed in the apparatus body 1A and the driving roller 63. That is, the gear transmission mechanism 90 transmits rotations outputted from the motor 91 serving as a driving source to the conveyance roller pair 61 serving as an actuator such that the conveyance roller pair 61 conducts a sheet conveyance action.

The gear transmission mechanism 90 includes a driving gear 92 attached to an output shaft of the motor 91, a driven gear 110 attached to the roller shaft 120 and an idler gear 93 meshing with both of the driving gear 92 and the driven gear 110. The driving gear 92 and the idler gear 93 are disposed on the apparatus body 1A, and the driven gear 110 is disposed on the openable cover 75. Accordingly, as the motor 91 starts to drive, driving force is transmitted to the roller shaft 120 through the driving gear 92, the idler gear 93 and the driven gear 110, and thus the driving roller 63 rotates.

Figure 4:
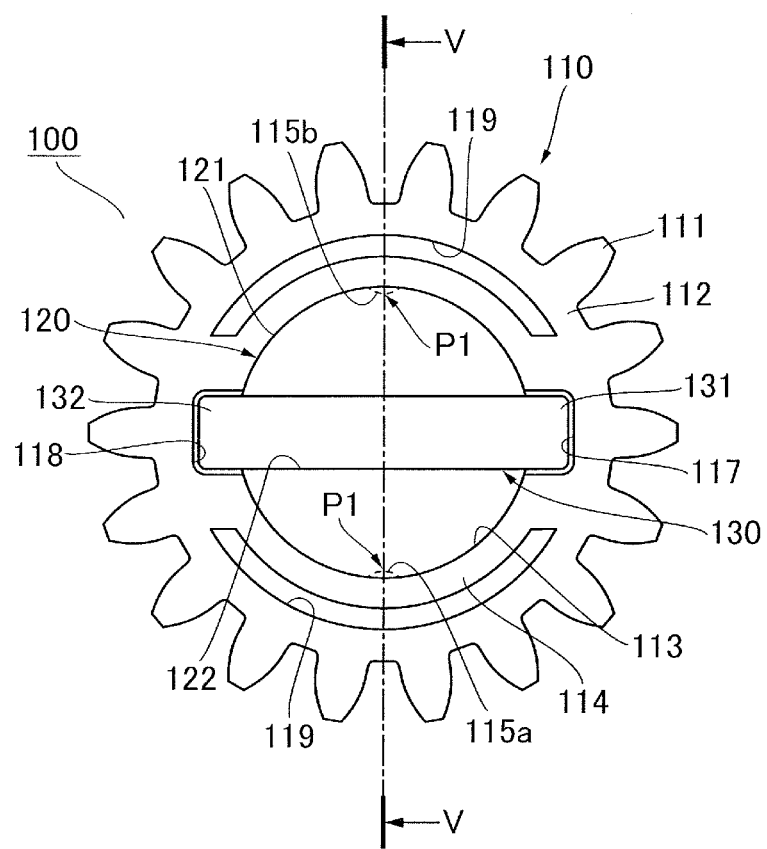
FIG. 4 is a schematic diagram illustrating a gear structure of a first embodiment viewed in an axial direction thereof.

As illustrated in FIG. 4, a parallel pin 130 is inserted through the roller shaft 120, and the driven gear 110 is engaged with the parallel pin 130 at an engage groove 117. The driven gear 110 is mounted on the roller shaft 120 through the parallel pin 130 with relative rotation of the driven gear 110 to the rotation shaft 120 being restricted, and driving force is transmitted through a contact portion of the parallel pin 130 with the engage groove 117. That is, the gear transmission mechanism 90 includes a gear structure 100 composed of the roller shaft 120, the parallel pin 130 and the driven gear 110. The driven gear 110 is one example of a rotating member attached to the roller shaft 120 serving as a shaft and transmits rotation from another member (i.e., an idler gear 93 in this embodiment) while rotating together with the roller shaft 120.

Here, vibration of the driven gear 110 engaging with the roller shaft 120 through the pin will be described. There is a case where a gap is produced between an inner circumferential surface 113 of the driven gear 110 and an outer circumferential surface 121 of the roller shaft 120 facing the inner circumferential surface 113 after the driven gear 110 is attached to the roller shaft 120. Such gap might be produced due to tolerance between an outer diameter of the roller shaft 120 and an inner diameter of the driven gear 110 and/or to a demolding inclination in a case where the driven gear 110 is a molded product or resin.

If the gear transmission mechanism 90 operates in the condition in which there is a gap between the roller shaft 120 and the driven gear 110, the driven gear 110 might swing periodically along with the rotation of the gear structure 100. That is, unfavorable vibration may be generated as the driven gear 110 swings with respect to a rotation axis of the roller shaft 120 with the parallel pin 130 acting as a fulcrum when viewed in an axial direction of the parallel pin 130. In such a case, not only the collision between the driven gear 110 and the roller shaft 120 may cause an increase of noise level, but also may cause such concern that the drive transmission efficiency and durability of the driven gear 110 drop.

Among other gears, the driven gear 110 receives driving force from the idler gear 93 serving as a driving gear and is a member that is engaged with and disengaged from the driving gear along with opening/closing of the openable cover 75 as a movable member. Accordingly, there is a possibility that a distance between the roller shaft 120 and a supporting shaft 93a (see FIG. 2B) of the idler gear 93 fluctuates or that an inclination is caused depending on positioning accuracy of the openable cover 75 and the apparatus body 1A when the openable cover 75 is closed. Accordingly, an influence of the vibration caused by swinging of the driven gear 110, in the case where there is the gap between the driven gear 110 and the roller shaft 120, tends to be more significant in such configuration.

As another case where vibration of the rotating member as may be of concern, a gear transmission mechanism configured to drive curl correcting rollers will be described. As illustrated in FIG. 1, the sheet S sent out of the fixing roller pairs 51 and 52 of the fixing unit 50 sequentially passes through first and second correcting roller pairs 58 and 59, each of which is another example of a conveyance member.

Figure 3A:
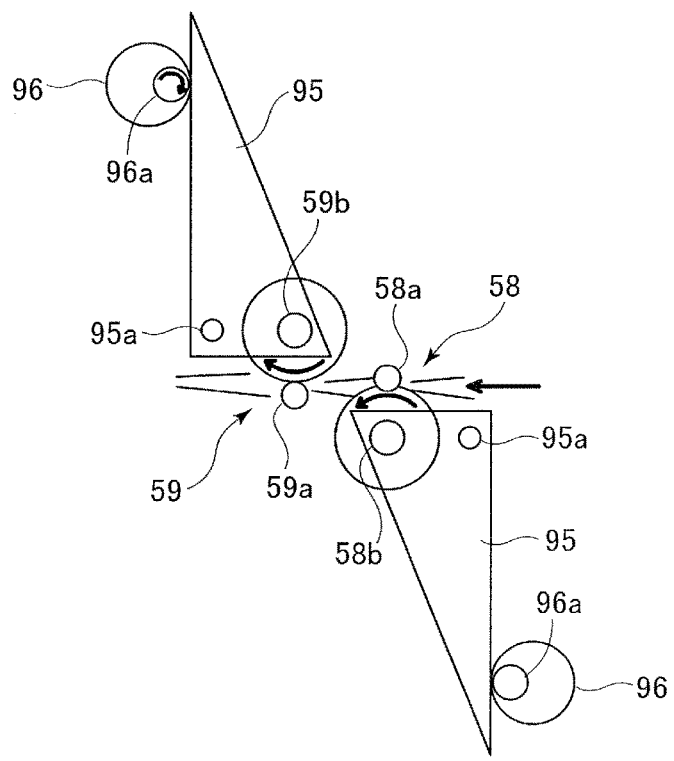
FIG. 3A is a schematic diagram illustrating a configuration for correcting a curl of a sheet.

As illustrated in FIG. 3A, the first correcting roller pair 58 is composed of a metal roller 58a configured to be in contact with a first surface of the sheet, i.e., an upper surface of the sheet in FIG. 3A, and a sponge roller 58b that is in contact with the metal roller 58a. The second correcting roller pair 59 is also composed of a metal roller 59a configured be in contact with a second surface of the sheet, i.e., a lower surface of the sheet in FIG. 3A, and a sponge roller 59b that is in contact with the metal roller 59a. Each of the metal rollers 58a and 59a is a third roller in the present embodiment, and each of the sponge rollers 58b and 59b is a fourth roller whose outer circumferential portion is composed of an elastic material whose diameter is larger than that of the third roller and which is softer than an outer circumferential portion of the third roller.

Strength of the curl correcting function of the first and second correcting roller pairs 58 and 59 can be adjusted by cam mechanisms (95 and 96) serving as pressing portions provided for the respective roller pairs. That is, the respective sponge rollers 58b and 59b are supported by holders 95 that are swingable centering on a rotary shaft 95a, and the holders 95 are in contact with cams 96 attached to cam shafts 96a. As the cam shafts 96a rotate, the holders 95 swing by being pressed by the cams 96, and a center distance between a rotation axis of the sponge roller 58b or 59b and a rotation axis of the corresponding metal roller 58a or 59a is changed. This arrangement makes it possible to independently control intrusion amounts of the metal rollers 58a and 59a to the respective sponge rollers 58b and 59b.

In a case of correcting a convex curl of the first surface of the sheet (i.e., when the sheet is convex upward in FIG. 3A) the intrusion amount of the metal roller 58a of the first correcting roller pair 58 is set larger and the intrusion amount of the metal roller 59a of the second correcting roller pair 59 is set smaller. In this case, when the sheet passes through the first correcting roller pair 58, the curl of the sheet is corrected because the first surface is pressed by the metal roller 58a in a condition in which the second surface is supported by the sponge roller 58b. In a case of correcting a concave curl of the first surface of the sheet, the intrusion amount of the metal roller 58a of the first correcting roller pair 58 is set smaller and the intrusion amount of the metal roller 59a of the second correcting roller pair 59 is set larger.

Figure 3B:
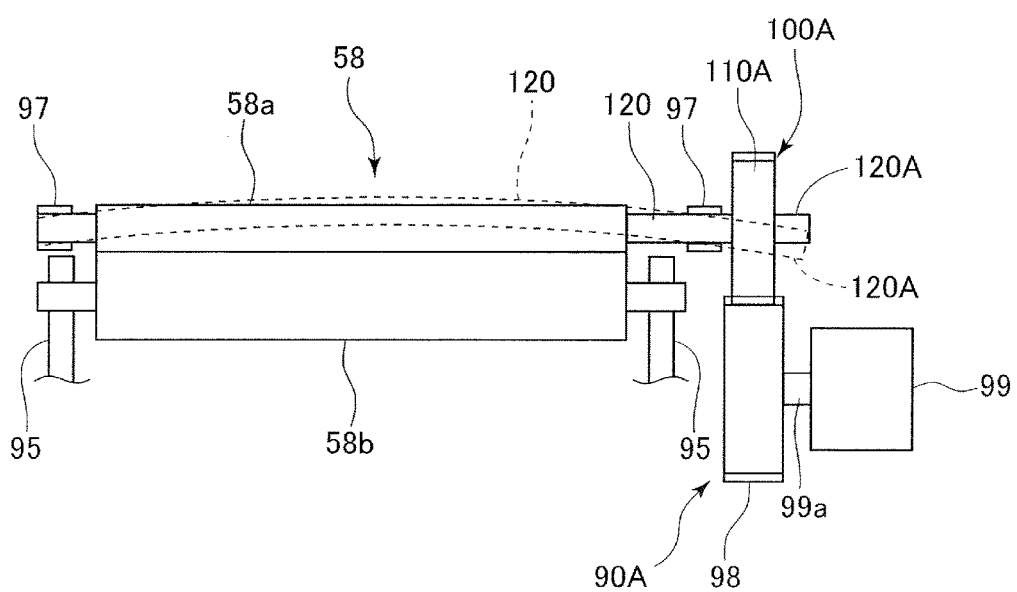
FIG. 3B is a schematic diagram illustrating a drive configuration for correcting a curl of a sheet.

As illustrated in FIG. 3B, the metal roller 58a, which is the driving roller of the first correcting roller pair 58, receives driving force from the motor 99 serving as a driving source through a gear transmission mechanism 90A which is another example of the drive transmission apparatus. The gear transmission mechanism 90A is composed of a driving gear 98 attached to an output shaft 99a of the motor 99 and a driven gear 110A attached to a roller shaft 120A of the metal roller 58a and engaged with the driving gear 98, and transmits rotation outputted by the motor 99 to the metal roller 58a. It is noted that the second correcting roller pair 59 is also driven through a transmission mechanism configured in the same manner with the gear transmission mechanism 90A.

A gear structure 100A is composed of the roller shaft 120A serving as a shaft and the driven gear 110A serving as a rotating member. The driven gear 110A is engaged with the roller shaft 120A through a parallel pin inserted through the roller shaft 120A.

Here, the roller shaft 120A of the metal roller 58a is rotatably supported by bearings 97 fixed to the apparatus body by both ends of the roller shaft 120A. Therefore, as the intrusion amount of the metal roller 58a to the sponge roller 58b becomes larger by moving the holder 95, the metal roller 58a is pressed more strongly by the sponge roller 58b made of elastic material. Then, the roller shaft 120A deflects in a direction separating from a rotation axis of the sponge roller 58b (i.e., upward in FIG. 3B) between the bearings 97 and 97, and becomes not in parallel with the output shaft 99a of the motor 99 (the deflection is exaggerated as indicated by a broken line). In this case, the rotation axis of the driven gear 110A becomes inclined with respect to that of the driving gear 98 due to the deflection of the roller shaft 120A.

Then, if the roller shaft 120A deflects as such in a condition in which there is a gap between the roller shaft 120A and the driven gear 110A, the driven gear 110A swings with respect to the roller shaft 120A with the parallel pin acting as a fulcrum along with rotation of the motor 99. Thereby, the driven gear 110A might vibrate, causing collision noise of the roller shaft 120A or other unfavorable situations as a result.

Besides that, as illustrated in FIG. 1, the image forming apparatus 1 includes roller pairs whose nip pressure needs to be kept at certain pressure or more. For instance, such roller pairs are exemplified by the fixing roller pairs 51 and 52 for pressurizing the sheet S in order to fix the toner image, or by the drawing roller pairs 21 and 22 that sometimes need to draw out the sheet S in a condition in which drive of the feed unit 12 is stopped. It is preferably taken into consideration that a rotating member like a gear attached to a roller shaft vibrates in such configuration.

Vibration Reduction Structure of Rotary Member

According to the present embodiment, a rotating member is engaged with a shaft by means of a pin, and a protruded portion is formed on one of an outer circumferential surface of the shaft and an inner circumferential surface of the rotating member such that the protruded portion is in pressure contact with another one of the outer circumferential surface of the shaft and the inner circumferential surface of the rotating member. With this configuration, while rotation is transmitted between the shaft and the rotating member mainly through the pin, the shaft is press-fitted into the rotating member in a condition in which the protruded portion is deformed, thus suppressing the rotating member from swinging. It is possible to assure workability of assembly operation because attachment of the rotating member can be done with a relatively small force that is required to deform the protruded portion, as compared to a configuration of so-called tight fit in which a diameter of an outer circumferential surface of a shaft is set smaller than a diameter of an inner circumferential surface of a rotating member.

It is noted that the protruded portion may be disposed at least on one of the outer circumferential surface of the shaft and the inner circumferential surface of the rotating member. While a cross-sectional shape of the protruded portion in a view from the axial direction of the shaft may be trapezoidal, circular arc, triangular or the like, the cross-sectional shape may be changed to any shape as long as the protruded portion projects radially from one to the other of the outer circumferential surface of the shaft and the inner circumferential surface of the rotating member. Preferably, the protruded portions are disposed at a plurality of positions in a circumferential direction with respect to the rotation axis of the shaft and more preferably, the protruded portions are disposed at one side and at another side with respect to the rotation axis of the shaft when viewed in a direction in which the pin projects. Still further, in a case where a plurality of protruded portions is disposed, it is preferable to dispose the protruded portions at rotational symmetric positions by disposing equidistantly in the circumferential direction. That is, it is preferable to dispose the protruded portions such that an arithmetic average of coordinates of the protruded portions in a plane vertical to the axial direction coincides with the rotation axis of the shaft. Concerning the axial direction, it is preferable to provide the protruded portions at positions separate from a position where the pin engages with the rotating member. In this case, the protruded portion may be disposed so as to be dispersed at a plurality of positions different from the engage positions or may be formed into a shape that extends along the axial direction from the engage position.

Still further, the rotating member is not limited to be a spur gear and may be replaced with a helical gear, a bevel gear, a worm gear or the like. The rotating member may be replaced with a rotating member other than a cogwheel. Such member may be exemplified by a pulley in a belt driving mechanism, a sprocket in a chain driving mechanism, and a cam in a cam mechanism. The pin is not limited to be the parallel pin and may be formed into another shape. The pin may be also formed integrally with the shaft by resin molding or other processes.

Specific structural examples of the gear transmission mechanism 90 will be described below. It is noted that the gear transmission mechanism 90 described above is one example of the drive transmission apparatus and the following embodiments may be used for other parts of the image forming apparatus 1 or for an apparatus other than the image forming apparatus. Therefore, the driven gear 110 will be called just as a 'cogwheel' and the roller shaft 120 will be called just as a 'shaft' in the following description. Still further, a shape of a structure corresponding to the protruded portion (e.g., protrusions 115a and 115b in FIG. 4) before the rotating member is attached to the shaft will be indicated by broken lines in FIGS. 4 through 9.

First Embodiment

The gear structure 100 of the first embodiment will be described with reference to FIG. 4. FIG. 4 is a schematic diagram representing a sectional structure of the gear structure 100 when viewed in the axial direction, i.e., in a direction along the rotation axis, of the roller shaft 120.

As illustrated in FIG. 4, the gear structure 100 is composed of the three members: the cogwheel 110 serving as a rotating member; the shaft 120 serving as a shaft; and the parallel pin 130 serving as a pin. The shaft 120 and the parallel pin 130 are made of metal, and the cogwheel 110 is a resin molded article composed of synthetic resin.

The shaft 120 is a shaft having an outer circumferential surface 121 whose section is a circle and is provided with a pin hole 122 perforated vertically to the axial direction and disposed at a position passing through the rotation axis of the shaft 120. The parallel pin 130 is inserted through the pin hole 122 such that the pin 130 projects out of the outer circumferential surface 121 of the shaft 120 radially outward on both sides with respect to the rotation axis. On one side surface of the cogwheel 110 in the axial direction are defined grooves (i.e., engage grooves 117 and 118) extending in a direction vertical to both of the axial direction and the parallel pin 130. The engage grooves 117 and 118 serving as engage portions engaging with the pin are engaged with projecting parts 131 and 132 of the parallel pin 130 projecting out of the shaft 120.

A row of teeth 111 composed of a plurality of teeth arrayed along the circumferential direction is formed on an outer circumferential portion 112 of the cogwheel 110. An inner circumferential portion 114 of the cogwheel 110 is provided with a gear hole through which the shaft 120 is inserted and a cylindrical inner circumferential surface 113 facing a cylindrical outer circumferential surface 121 of the shaft 120. An outer diameter of the shaft 120 (i.e., a diameter of the outer circumferential surface 121) is set to be equal with an inner diameter of the cogwheel 110 (i.e., a diameter of the inner circumferential surface 113), or is set to be slightly smaller than the inner diameter of the cogwheel 110 to a degree such that the outer circumferential surface 121 is not in tight-fit condition with respect to the inner circumferential surface 113.

The cogwheel 110 is provided with protrusions 115a and 115b each serving as a protruded portion that protrudes radially inside from the inner circumferential surface 113. Both of the protrusions 115a and 115b have a semi-circular shape in a section viewed in the axial direction, and at least a top portion P1 thereof is in contact with the outer circumferential surface 121 of the shaft 120. That is, the protruded portions are configured such that a distance from a center of the inner circumferential surface 113 to the top portion P1 is smaller than a radius of the outer circumferential surface 121 of the shaft 120 in a state where the cogwheel 110 is not attached to the shaft 120. Once the cogwheel 110 is attached to the shaft 120, the top portion P1 is pressed radially outside of the shaft 120 by deformation of the protrusions 115a and 115b and a periphery thereof.

The respective protrusions 115a and 115b extend on one side and another side in the axial direction from the position of the parallel pin 130 and are formed almost across a whole length of a width of the teeth 111 in the axial direction. The protrusions 115a and 115b are one example of the plurality of protruded portions equidistantly disposed in the circumferential direction centering on the rotation axis of the shaft 120 (referred to simply as a 'circumferential direction' hereinafter) and are disposed along a direction vertically intersecting with the parallel pin 130 in a view from the axial direction. The protrusion 115a corresponds to a first protruded portion and the protrusion 115b corresponds to a second protruded portion in this embodiment.

An assembly method of the gear structure 100 will be described below. The cogwheel 110 is attached to the shaft 120 by fitting with the shaft 120 from one of the axial direction (or by inserting the shaft 120 through the cogwheel 110) in a state where the parallel pin 130 has been inserted through the pin hole 122 in advance. Here, the engage grooves 117 and 118 provided on the side surface of the cogwheel 110 engage with the projecting parts 131 and 132 of the parallel pin 130, so that the shaft 120 is coupled with the cogwheel 110. Still further, the shaft 120 is press-fitted into the gear hole of the cogwheel 110 with the protrusions 115a and 115b deformed by being pressed by the outer circumferential surface 121 of the shaft 120. After that, a snap ring (see a ring groove 125 in FIG. 5 for example) facing a side surface opposite from the engage grooves 117 and 118 is attached to the shaft 120 to restrict movement of the cogwheel 110 in the axial direction and to prevent the cogwheel 110 from disengaging from the parallel pin 130. It is noted that the movement of the cogwheel 110 in the axial direction may be restricted by providing another component instead of the snap ring (e.g., another cogwheel) facing the cogwheel 110.

A gap between the inner circumferential surface 113 of the cogwheel 110 and the outer circumferential surface 121 of the shaft 120 is filled in a state where the cogwheel 110 is attached to the shaft 120, by the protrusions 115a and 115b being squashed. This arrangement makes it possible to engage the shaft 120 and the cogwheel 110 to be relatively unrotatable through the parallel pin 130, while the protrusions 115a and 115b restrict the movement of the cogwheel 110 with respect to the shaft 120 in the direction intersecting with the axial direction. Accordingly, the cogwheel 110 is prevented from swinging with respect to the shaft 120 even when the gear structure 100 is driven to rotate by another cogwheel, thereby preventing vibration from occurring and avoiding such troubles of the sound of collision otherwise from being generated. Still further, a force necessary in pressing the shaft 120 into the gear hole will be as small as a force that is required to deform the protrusions 115a and 115b. Therefore, it is possible to perform the attachment operation with a smaller force as compared to a configuration in which a columnar shaft is tight-fitted into a cylindrical gear hole to restrict swinging of the cogwheel 110. In short, vibration of the cogwheel 110 during rotation will be prevented while assuring workability in assembling the gear structure 100B.

It is noted that intrusion amounts of the protrusions 115a and 115b against the shaft 120 are set to be equal among the protrusions 115a and 115b disposed at a plurality of places in the circumferential direction. Here, the intrusion amount represents a difference between (i) a distance from the center of the gear hole to the protrusions 115a and 115b in a state where the cogwheel 110 is not attached to the shaft 120 and (ii) a radius of the outer circumferential surface 121 of the shaft 120. It is possible to equalize pressure for deforming the protrusions 115a and 115b in press-fitting the shaft 120 into the gear hole and to readily adjust the rotation axis of the cogwheel 110 to that of the shaft 120 by equally setting the intrusion amounts.

A degree of the intrusion amount is set, by considering elastic modulus and others of the resin material composing the cogwheel 110, so as to achieve both the workability in the assembly operation and effectiveness of reducing vibration of the cogwheel 110. In doing so, the intrusion amount needs not be always kept within an elastic range of the cogwheel 110, and the protrusions 115a and 115b may be plastically deformed in press-fitting the shaft 120.

Still further, the cogwheel 110 of the present embodiment may be molded from synthetic resin by injection molding. Specifically, a movable mold is used as a mold corresponding to the side surface, on which the engage grooves 117 and 118 are provided, of the cogwheel 110 and a fixed mold is used as a mold corresponding to the side surface on the opposite side. The inner circumferential surface 113 and the protrusions 115a and 115b are preferably formed by providing a columnar protrusion on the fixed mold. In this case, it is conceivable to taper off the columnar protrusion such that the inner diameter of the inner circumferential surface 113 gradually increase as it extends toward the side surface opposite from the engage groove in to the axial direction, in order to increase mold-releasability. Setting the intrusion amount of the protrusions 115a and 115b appropriately in such configuration, the gap between the inner circumferential surface 113 of the cogwheel 110 and the outer circumferential surface 121 of the shaft 120 will be filled by the protrusions 115a and 115b. That is, according to this exemplary configuration, vibration of the cogwheel 110 in a finished product will be reduced while reducing production costs by increasing productivity of the cogwheel 110 which is a resin molded article.

Still further, while the protrusions 115a and 115b are disposed at the two places along the direction vertical to the parallel pin 130 when viewed in the axial direction in the present embodiment, three or more protrusions may be disposed on the inner circumferential surface 113 of the cogwheel 110.

Second Embodiment

A gear structure 100B of the second embodiment will be described with reference to FIG. 5. The gear structure 100B of the present embodiment is different from that of the first embodiment in positioning of the protrusions in the axial direction. Other components common with those of the first embodiment will be denoted by the same reference numerals and description thereof will be omitted here.

Figure 5:
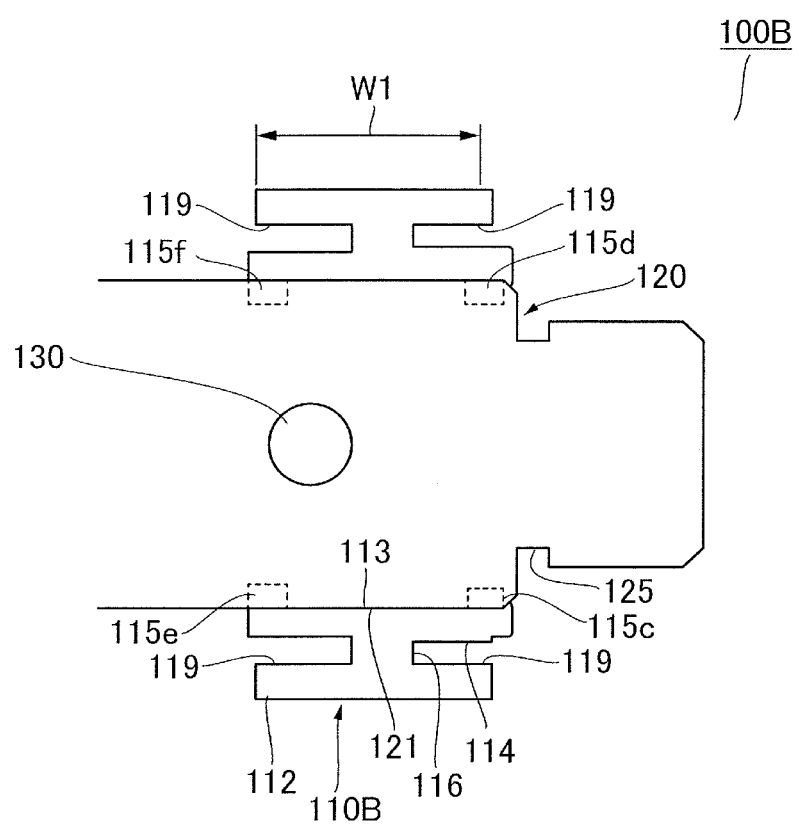
FIG. 5 is a schematic diagram illustrating a sectional structure of a gear structure of a second embodiment.

FIG. 5 is a schematic diagram illustrating a sectional structure of the gear structure 100B in a plane including the rotation axis of the shaft 120, where a position of the section corresponds to that of the plane illustrated in FIG. 5. The cogwheel 110B of the gear structure 100B of the present embodiment is provided with protrusions 115c, 115d, 115e and 115f disposed, at a plurality of positions in the circumferential direction, on the inner circumferential surface 113 forming a gear hole similarly to the first embodiment. Each protrusion 115c, 115d, 115e or 115f serves as a protruded portion in the present embodiment. The protrusions 115c through 115f include (i) a group of the protrusions 115c and 115e disposed on one side with respect to the rotation axis of the shaft 120 when viewed in a direction in which the parallel pin 130 projects and (ii) a group of protrusions 115d and 115f disposed on another side with respect to the rotation axis of the shaft 120.

Here, the protrusions 115c through 115f of the present embodiment are disposed at both ends of the inner circumferential surface 113 of the cogwheel 110B in the axial direction. The protrusions 115c through 115f are also disposed so as to avoid a connecting portion 116 connecting the outer circumferential portion 112, on which the plurality of teeth is provided, with the inner circumferential portion 114, on which the inner circumferential surface 113 is provided. The outer circumferential portion 112 and the inner circumferential portion 114 are both cylindrical, and the connecting portion 116 serving as a supporting portion extends radially outward from the inner circumferential portion 114 and supports the outer circumferential portion 112. The connecting portion 116 is formed such that a width in the axial direction is smaller than those of the outer circumferential portion 112 and the inner circumferential surface 113 at least at a circumferential position where the protrusions 115c through 115f are disposed. Therefore, there is a gap 119 between the outer circumferential portion 112 and the inner circumferential portion 114 in a radial direction. The protrusions 115c through 115f are disposed at positions separate from that of the connecting portion 116 in terms of the axial direction, and the connecting portion 116 does not overlap with any protrusions 115c, 115d, 115e or 115f when viewed in a radial direction from the rotation axis of the shaft.

In attaching the cogwheel 110B to the shaft 120, the shaft 120 is press-fitted into the gear hole of the cogwheel 110B such that the protrusions 115c through 115f are deformed. Therefore, similarly to the first embodiment, it is possible to avoid vibration of the cogwheel 110 during rotation while assuring the workability in assembling the gear structure 100B.

Still further, the protrusions 115c through 115f are disposed in a part of the inner circumferential surface 113 of the cogwheel 110B in the axial direction. Therefore, it is possible to attach the cogwheel 110B to the shaft 120 with a force lighter than that of the first embodiment in which the protrusion extends across almost the whole length of the inner circumferential surface 113.

The protrusions 115c through 115f are specifically disposed at the positions not overlapping with the connecting portion 116 when viewed in a radial direction from the rotation axis. Therefore, even in a case where the cogwheel 110B is deformed by the press-fitted shaft 120, the force applied to the protrusions 115c through 115f by the shaft 120 is absorbed mainly by deformation of the inner circumferential portion 114, so that stress caused in the outer circumferential portion 112 can be minimized. Then, deformation of tooth surfaces of the teeth 211 will be avoided and drive transmission efficiency of the gear structure 200 will be improved, and durability of the cogwheel 210 will be also improved. It is noted that it is fully conceivable to extend the protrusion in the axial direction like the first embodiment if it is desirable to more strongly restrict the vibration of the cogwheel 110B. Such configuration will be preferred in a case where a maximum value of a force received by the cogwheel 110B from another cogwheel is large, for example.

It is noted that the disposition of the protrusions in the axial direction and the circumferential direction is not limited to what described in the first and second embodiments, and the disposition can be appropriately changed as long as it is configured such that the gap between the inner circumferential surface of the cogwheel and the outer circumferential surface of the shaft is filled once the cogwheel is attached to the shaft. For instance, assuming a configuration in which a position of the parallel pin 130 in the axial direction is shifted as compared to a center position of the cogwheel 110B (i.e., when the engage groove is shallow) as illustrated in FIG. 5, only the protrusions 115c and 115d on the side opposite from the parallel pin 130 may be disposed. Because a distance of these protrusions 115c and 115d from the parallel pin 130 that can be a fulcrum of swing is long, the protrusions 115c and 115d would effectively reduce vibration of the cogwheel 110B with a minimum configuration.

Still further, instead of arranging the plurality of protrusions in a line along the axial direction (e.g., the protrusions 115c and 115e), a protrusion at a certain position in the axial direction may be shifted in terms of the circumferential direction from another protrusion at a separate position in the axial direction. This arrangement will improve workability of unmolding step in molding the cogwheel 110B by resin. In this case, it is preferable to dispose each groups of protrusions disposed in one position in the axial direction such that they are disposed equidistantly in the circumferential direction with respect to the center of rotation of the cogwheel 110B.

Third Embodiment

Figure 6:
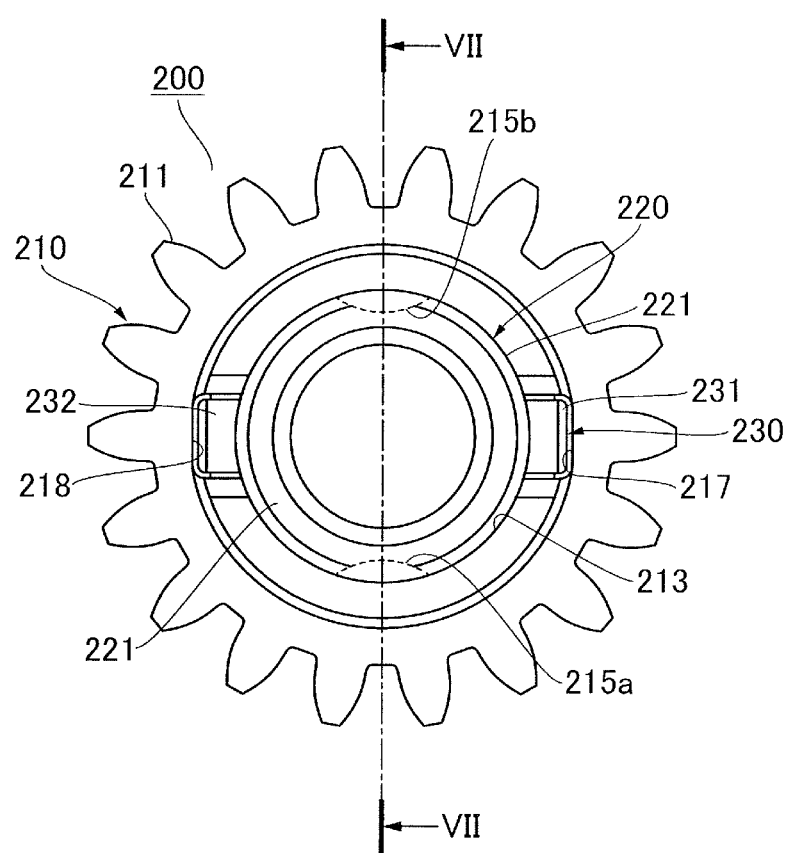
FIG. 6 is a schematic diagram illustrating a gear structure of a third embodiment viewed in an axial direction thereof.

A gear structure 200 of a third embodiment will be described with reference to FIGS. 6 and 7. FIG. 6 is a side view illustrating the gear structure 200 viewed in the axial direction, and FIG. 7 is a section view of a section illustrated in FIG. 6.

Figure 7:
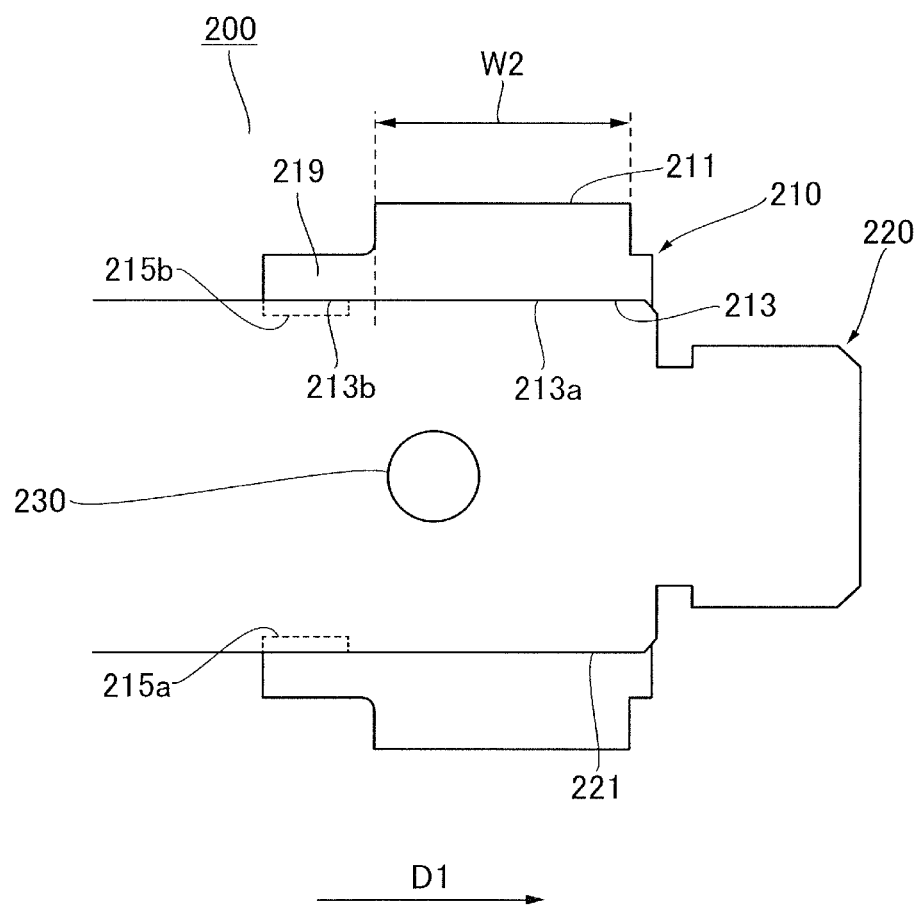
FIG. 7 is a schematic diagram illustrating a sectional structure of a gear structure of a third embodiment.

As illustrated in FIGS. 6 and 7, a cogwheel 210 is attached to a shaft 220 such that an inner circumferential surface 213 thereof faces an outer circumferential surface 221 of the shaft 220, and that the cogwheel 210 engages with projecting parts 231 and 232 of a parallel pin 230 at engage grooves 217 and 218 thereof. Protrusions 215a and 215b each serving as a protruded portion are protruding radially inward at two positions in the circumferential direction from the inner circumferential surface 213 forming a gear hole. The protrusions 215a and 215b are other examples of the first and second protrusions.

Here, the cogwheel 210 of the present embodiment includes a cylindrical extension 219 extended outside of a range W2 where a row of teeth 211 is provided in the axial direction (see FIG. 7), and the protrusions 215a and 215b are disposed on an inner circumferential side of the extension 219. That is, the inner circumferential surface 213 of the cogwheel 210 of the present embodiment includes a first area 213a disposed at a position in the axial direction that overlaps with a position of the teeth 211 in the axial direction and a second area 213b disposed at a position that does not overlap with the position of the teeth 211. The protrusions 215a and 215b are disposed in the second region 213b. Due to that, the both protrusions 215a and 215b do not overlap with the teeth 211 of the cogwheel 210 when viewed in a direction radially outward from the rotation axis of the shaft 220.

When attaching the cogwheel 210 to the shaft 220, the shaft 220 is press-fitted into the gear hole of the cogwheel 210 such that the protrusions 215a and 215b are deformed. Due to that, similarly to the first and second embodiments, vibration of the cogwheel 210 during rotation will be reduced while assuring workability in assembling the gear structure 200.

Still further, according to the present embodiment, the protrusions 215a and 215b are disposed at the positions not overlapping with the teeth 211 of the cogwheel 210 when viewed in the direction radially outward from the inside of the cogwheel 210. Therefore, even in a case where the cogwheel 210 is deformed by the press-fitted shaft 220, the force applied to the protrusions 215a and 215b by the shaft 220 is absorbed mainly by deformation of the extension 219, so that stress caused in the teeth 211 will be minimized. This will suppress deformation of tooth surfaces of the teeth 211, improving drive transmission efficiency of the gear structure 200 as well as durability of the cogwheel 210.

It is noted that while the extension 219 of the present embodiment is disposed upstream with respect to the teeth 211 in a direction D1 in which the shaft 220 is inserted into the gear hole (see FIG. 7), the extension 219 may be disposed downstream with respect of the teeth 211 or the extensions 219 may be disposed both upstream and downstream. If the extension 219 is disposed only downstream of the teeth 211, a distance by which the shaft 220 swings in a state where the shaft 220 is in pressure contact with the protrusions 215a and 215b is shortened, so that labor required in the assembling works can be reduced further. Meanwhile, in a case where the extension 219 is disposed upstream of the teeth 211 like the present embodiment, such a possibility that the cogwheel 210 once attached to the shaft 220 falls out during the assembling operation will be minimized. Still further, details such as a number of protrusions in the circumferential direction and in the axial direction, length, disposition and a shape of the protrusion may be modified as necessary.

Fourth Embodiment

Figure 8:
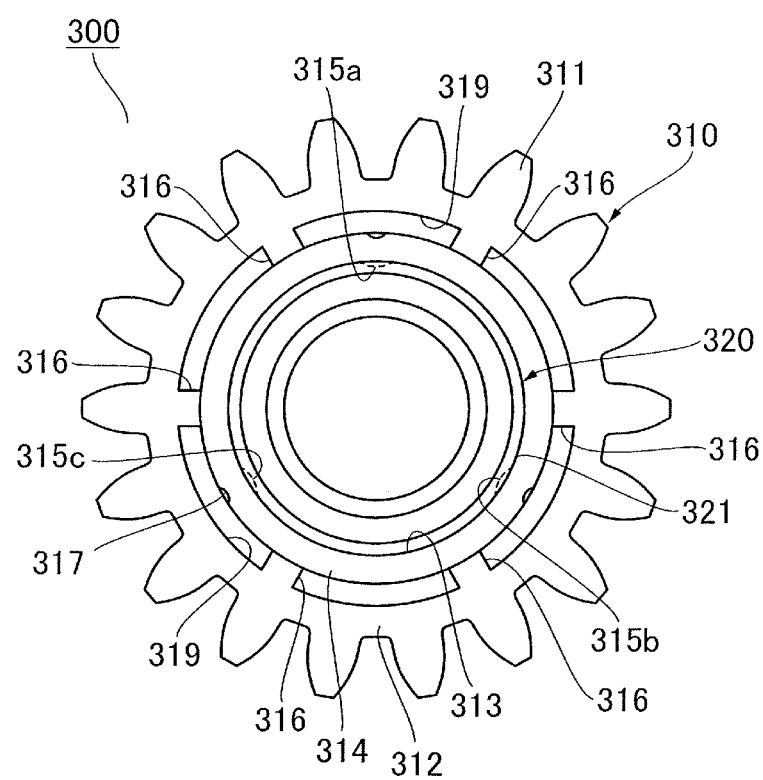
FIG. 8 is a schematic diagram illustrating a gear structure of a fourth embodiment viewed in an axial direction thereof.

A gear structure 300 of a fourth embodiment will be described with reference to FIG. 8. FIG. 8 is a side view illustrating the gear structure 300 when viewed in the axial direction.

As illustrated in FIG. 8, a cogwheel 310 is attached to a shaft 320 such that an inner circumferential surface 313 thereof faces an outer circumferential surface 321 of a shaft 320, and that the cogwheel 310 engages with projecting parts of a parallel pin at engage grooves similarly to the first through third embodiments. Protrusions 315a, 315b and 315c disposed equidistantly at three places in the circumferential direction and protruding radially inward from the inner circumferential surface 313 forming a gear hole. Each protrusion 315a, 315b or 315c is a protruded portion of the present embodiment.

The cogwheel 310 of the present embodiment includes an outer circumferential portion 312 around which a row of teeth 311 is formed, an inner circumferential portion 314 on which the inner circumferential surface 313 is provided and located radially inside of the outer circumferential portion 312 and a plurality of ribs 316 connecting the outer circumferential portion 312 with the inner circumferential portion 314. Each rib 316 is another example of a supporting portion, and supports the outer circumferential portion 312 by extending radially outward from the inner circumferential portion 314 at a plurality of positions (e.g., six positions in FIG. 8) in the circumferential direction. A gap 319 is defined between each pair of ribs 316 adjacent in the circumferential direction and between the outer circumferential portion 312 and the inner circumferential portion 314 in the radial direction.

The protrusions 315a through 315c are disposed at positions separate from the ribs 316 (i.e., intermediate positions between the ribs 316) in the circumferential direction. That is, all of the protrusions 315a through 315c are provided at positions not overlapping with the ribs 316 when viewed in a direction radially outward from the rotation axis of the shaft 320.

In attaching the cogwheel 310 to the shaft 320, the shaft 320 is press-fitted into a gear hole of the cogwheel 310 such that the protrusions 315a through 315c are deformed. Therefore, as similar to the first embodiment, vibration of the cogwheel 310 during rotation will be avoided while assuring workability in assembling the gear structure 300.

Still further, the protrusions 315a through 315c are disposed at the positions different from the ribs 316 in the present embodiment. Therefore, even in a case where the cogwheel 310 is deformed by the press-fitted shaft 320, the force applied to the protrusions 315a through 315c by the shaft 320 is absorbed mainly by deformation of the inner circumferential portion 314, so that stress caused in the outer circumferential portion 312 can be minimized. This will suppress deformation of tooth surfaces of the teeth 311, improving drive transmission efficiency of the gear structure 300 as well as durability of the cogwheel 310.

It is noted that as illustrated in FIG. 8, it is also possible to adjust the force required in press-fitting the shaft 320 by providing a concave portion 317 depressed radially inward at positions corresponding to the protrusions 315a through 315c on the outer circumferential surface of the inner circumferential portion 314, in order to make the inner circumferential portion 314 to deform more easily. Still further, the disposition and the shape of the protrusions 315a through 315c in the axial direction may be set as necessary by making reference to the first through third embodiments, and the disposition, the number and the shape of the protrusions in the circumferential direction may also be modified as necessary.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-085339, filed on Apr. 24, 2017, which is hereby incorporated by reference wherein in its entirety.

What is claimed is:

1. A drive transmission apparatus comprising:
a rotatable shaft;
a pin provided on the shaft and projecting radially out of an outer circumferential surface of the shaft;
a rotating member configured to rotate with the shaft, the rotating member comprising an inner circumferential surface facing the outer circumferential surface of the shaft and an engage portion configured to engage with the pin; and
a protruded portion provided on one of the outer circumferential surface of the shaft and the inner circumferential surface of the rotating member and disposed in pressure contact with the other one of the outer circumferential surface of the shaft and the inner circumferential surface of the rotating member.

2. The drive transmission apparatus according to claim 1, wherein the protruded portion is provided on the inner circumferential surface of the rotating member,
wherein when viewed in an axial direction of the shaft, the outer circumferential surface of the shaft is cylindrical in a section at a position in the axial direction where the protruded portion is provided,
wherein a diameter of the outer circumferential surface of the shaft is smaller than that of the inner circumferential surface of the rotating member, and wherein in a state where the rotating member is not attached to the shaft, a distance from a rotation axis of the rotating member to the protruded portion is smaller than a radius of the outer circumferential surface of the shaft.

3. The drive transmission apparatus according to claim 1, wherein the protruded portion is provided at a position in a circumferential direction of the shaft separate from a position where the pin projects out of the outer circumferential surface of the shaft.

4. The drive transmission apparatus according to claim 3, wherein the protruded portion is one of a pair of protruded portions disposed on one side and another side of a rotation axis of the shaft when viewed in a direction in which the pin projects.

5. The drive transmission apparatus according to claim 1, wherein the protruded portion is one of a plurality of protruded portions disposed at rotationally symmetrical positions centering on a rotation axis of the shaft when viewed in an axial direction of the shaft.

6. The drive transmission apparatus according to claim 1, wherein at least a part of the protruded portion is provided at a position in an axial direction of the shaft different from an engage position where the engage portion engages with the pin.

7. The drive transmission apparatus according to claim 1, wherein the rotating member is a cogwheel on which a plurality of teeth is formed.

8. The drive transmission apparatus according to claim 7, wherein the inner circumferential surface comprises a first area and a second area, the first area being disposed at a position in an axial direction of the shaft that overlaps with a position of the plurality of teeth of the cogwheel, the second area being disposed at a position in the axial direction that does not overlap with the position of the plurality of teeth, and
wherein the protruded portion is disposed in the second area.

9. The drive transmission apparatus according to claim 7, wherein the cogwheel comprises
an inner circumferential portion provided with the inner circumferential surface,
an outer circumferential portion disposed radially outside of the inner circumferential portion and provided with the plurality of teeth, at least a part of the outer circumferential portion being separate from the inner circumferential portion in a radial direction of the shaft, and
a supporting portion extending radially outward from a part of the inner circumferential portion in a circumferential direction of the shaft and supporting the outer circumferential portion, and
wherein the protruded portion is disposed at a position, in the circumferential direction, separate from a position of the supporting portion.

10. The drive transmission apparatus according to claim 9, wherein a length of the supporting portion in an axial direction of the shaft is smaller than a width of the plurality of teeth in the axial direction, and
wherein the protruded portion is disposed at a position in the axial direction separate from the supporting portion.

11. The drive transmission apparatus according to claim 9, wherein the supporting portion is one of a plurality of supporting portions provided at a plurality of positions in a circumferential direction of the shaft, and
wherein the protruded portion is disposed an intermediate position between the plurality of supporting portions in the circumferential direction.

12. The drive transmission apparatus according to claim 1, wherein the engage portion is a groove defined on one side surface of the rotating member in an axial direction of the shaft, and extends in a direction intersecting with the axial direction.

13. A drive transmission apparatus comprising:
a metal rotatable shaft;
a metal pin inserted through a hole formed in the shaft and projecting radially out from an outer circumferential surface of the shaft; and
a cogwheel composed of synthetic resin and configured to rotate with the shaft, the cogwheel comprising:
an inner circumferential surface facing the outer circumferential surface of the shaft;
an engage groove defined on one side surface of the cogwheel in an axial direction of the shaft and configured to engage with the metal pin; and
a plurality of teeth arrayed along a circumferential direction of the shaft,
wherein the cogwheel further comprises a first protruded portion and a second protruded portion each protruding radially inward from the inner circumferential surface and disposed in pressure contact with the outer circumferential surface of the shaft, and
wherein the first protruded portion and the second protruded portion are disposed respectively on one side and on another side with respect to a rotation axis of the shaft when viewed in a direction in which the metal pin projects.

14. An image forming apparatus comprising:
an image forming unit configured to form an image on a sheet;
a conveyance member configured to convey the sheet by rotating in contact with the sheet; and
a drive transmission apparatus configured to transmit driving force to the conveyance member, the drive transmission apparatus comprising:
a rotatable shaft;
a pin provided on the shaft and projecting radially out of an outer circumferential surface of the shaft;
a rotating member configured to rotate with the shaft, the rotating member comprising an inner circumferential surface facing the outer circumferential surface of the shaft and an engage portion configured to engage with the pin; and
a protruded portion provided on one of the outer circumferential surface of the shaft and the inner circumferential surface of the rotating member and disposed in pressure contact with the other one of the outer circumferential surface of the shaft and the inner circumferential surface of the rotating member.

15. The image forming apparatus according to claim 14, further comprising:
an apparatus body;
an openable member configured to be opened and closed with respect to the apparatus body; and
a driving source provided in the apparatus body,
wherein the conveyance member comprises a first roller disposed on the openable member and a second roller disposed on the apparatus body, the first and second rollers being configured to be in contact with each other in a state where the openable member is closed so as to nip and convey the sheet, and wherein the shaft of the drive transmission apparatus is disposed in the openable member, and the first roller is supported on the shaft.

16. The image forming apparatus according to claim 14, further comprising a pressing portion configured to apply pressure to the sheet conveyed by the conveyance member,
   wherein the conveyance member is a roller pair comprising a third roller and a fourth roller configured to be kept in pressure contact by the pressing portion, the roller pair being configured to nip and convey the sheet on which an image has been formed by the image forming unit,
   wherein a diameter of the third roller is smaller than that of the fourth roller, and an outer circumferential portion of the fourth roller is composed of an elastic material softer than an outer circumferential portion of the third roller, and
   wherein the third roller is supported on the shaft of the drive transmission apparatus.

17. The image forming apparatus according to claim 14, wherein the shaft is made of metal,
   wherein the pin is made of metal and inserted through a hole formed in the shaft such that the pin projects out of the outer circumferential surface of the shaft to both sides in a radial direction with respect to a rotation axis of the shaft,
   wherein the rotating member is a cogwheel composed of synthetic resin and configured to rotate with the shaft, the rotating member comprising an engage groove configured to engage with the pin and a plurality of teeth arrayed along a circumferential direction of the shaft, and
   wherein the protruded portion is one of a first protruded portion and a second protruded portion each protruding radially inward from the inner circumferential surface and disposed in pressure contact with the outer circumferential surface of the shaft, and
   wherein the first protruded portion and the second protruded portion are disposed respectively on one side and on another side with respect to the rotation axis of the shaft when viewed in a direction in which the pin projects.

18. The image forming apparatus according to claim 14, wherein the protruded portion is disposed on the inner circumferential surface of the rotating member,
   wherein when viewed in an axial direction of the shaft, a section of the outer circumferential surface at a position where the protruded portion is provided is cylindrical,
   wherein a diameter of the outer circumferential surface of the shaft is smaller than that of the inner circumferential surface of the rotating member, and
   wherein in a state where the rotating member is not attached to the shaft, a distance from a rotation axis of the rotating member to the protruded portion is smaller than a radius of the outer circumferential surface of the shaft.

19. The image forming apparatus according to claim 14, wherein the rotating member is a cogwheel on which a plurality of teeth is formed,
   wherein the cogwheel comprises
      an inner circumferential portion provided with the inner circumferential surface,
      an outer circumferential portion disposed radially outside of the inner circumferential portion and provided with the plurality of teeth, at least a part of the outer circumferential portion overlapping with the inner circumferential portion when viewed in a direction radially outward from a rotation axis of the shaft, and
      a supporting portion extending radially outward from the inner circumferential portion and supporting the outer circumferential portion, and
   wherein the protruded portion is disposed at a position not overlapping with the supporting portion when viewed in the direction radially outward.

20. The image forming apparatus according to claim 14, wherein the rotating member is a cogwheel on which a plurality of teeth is formed,
   wherein the inner circumferential surface comprises a first area and a second area, the first area being disposed at a position in an axial direction of the shaft that overlaps with a position of the plurality of teeth of the cogwheel, the second area being disposed at a position in the axial direction that does not overlap with the position of the plurality of teeth, and
   wherein the protruded portion is disposed in the second area.

\* \* \* \* \*